Figure 1:
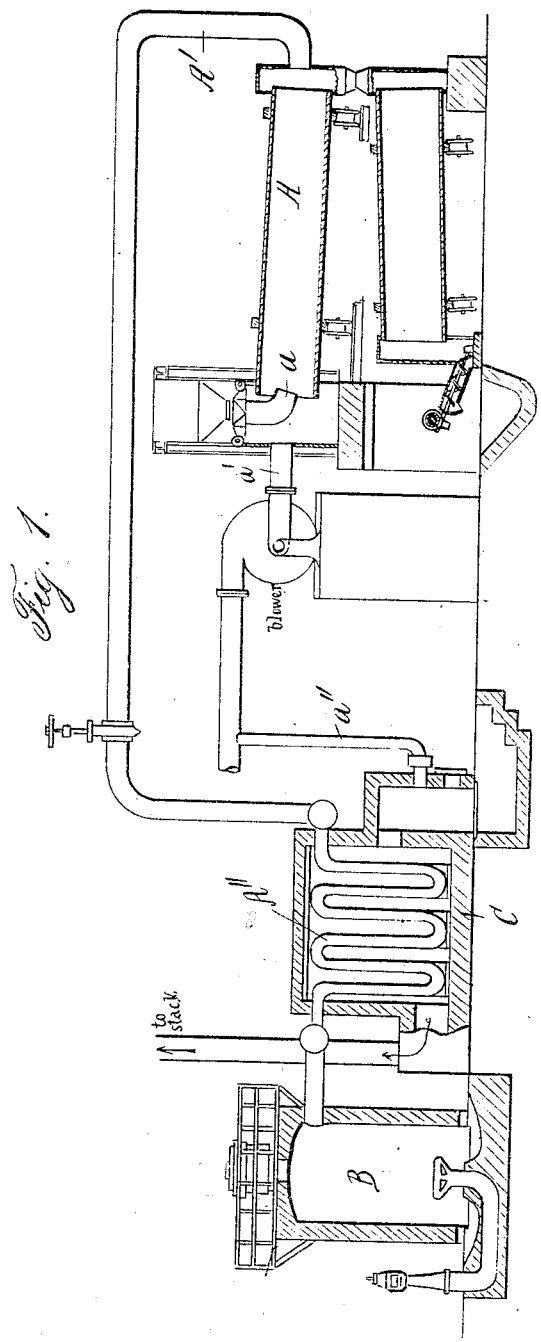

G. VON RAUSCHENPLAT.
PROCESS FOR REMOVING IRON FROM TIN ORES.
APPLICATION FILED JAN. 28, 1914.

1,196,049.

Patented Aug. 29, 1916.
2 SHEETS—SHEET 1.

INVENTOR:
Günzel von Rauschenplat
by John Lovka
ATTORNEY.

UNITED STATES PATENT OFFICE.

GÜNZEL von RAUSCHENPLAT, OF STEGLITZ, GERMANY, ASSIGNOR TO BARILLA LIMITED, OF LONDON, ENGLAND, A CORPORATION OF GREAT BRITAIN.

PROCESS FOR REMOVING IRON FROM TIN ORES.

1,196,049.

Specification of Letters Patent.

Patented Aug. 29, 1916.

Application filed January 28, 1914. Serial No. 815,029.

*To all whom it may concern:*

Be it known that I, GÜNZEL VON RAUSCHENPLAT, a subject of the German Emperor, and resident of Steglitz, Germany, have invented certain new and useful Improvements in Processes for Removing Iron from Tin Ores, of which the following is a specification.

Iron is one of the most unwelcome admixtures in tin ores, since it is reduced to the metallic state in the smelting of the ores in the calciner or furnace, or is dissolved in the tin bath and causes losses of tin owing to the formation of "hard heads"; generally speaking, as much tin is lost as there is iron contained in the ore. In order to reduce this drawback, it has been proposed to remove the iron from the ores in different ways, as by mechanical dressing, magnetic separation, and especially treating the concentrates with chemical solvents, for example hydrochloric acid. The ores contain the iron in the form of oxids or sulfids which by the roasting operation are converted into oxids soluble only with difficulty. On the other hand, lixiviation will produce compounds which are attacked only slightly even by concentrated acids, and therefore the final product obtained still contains a certain proportion of iron.

I have discovered that it is possible to obtain a better extraction of iron in the lixiviating of tin ores by using a treatment according to which the higher iron oxids of the original (or if necessary roasted) ore—in some cases after a preliminary concentration by any approved or well-known dressing process—are converted into products readily soluble in acids, for instance into $Fe_3O_4$, FeO, or Fe. For the reduction of these higher oxids, I may employ any of the customary reducing agents, for instance solid coal, carbon monoxid, or hydrogen, taking care to keep the temperature so low that the cassiterite is not attacked at all or but incompletely, so that there will be present a tin-oxygen compound insoluble in acids. I prefer to use gaseous reducing agents since with them it is easier to watch the reduction and to prevent contamination by ashes. For hastening the reduction I employ temperatures lying between 300 and 500° centigrade, according to the nature of the ore. With these temperatures, the major part of the iron is obtained in the form of FeO, and only a small proportion in the form of metallic iron or of $Fe_3O_4$. For the extraction of the iron from the reduced ore, I use an aqueous acid solution, for instance of hydrochloric acid or of sulfuric acid, the reduced product being treated in the well-known manner, say on the counter-current principle, if necessary with heating of the lyes or preferably hydrochloric acid gas. The dry reaction product is treated with this acid at temperatures lying between 400 and 500° centigrade. The iron is distilled in the form of volatile chlorid.

Figure 2:
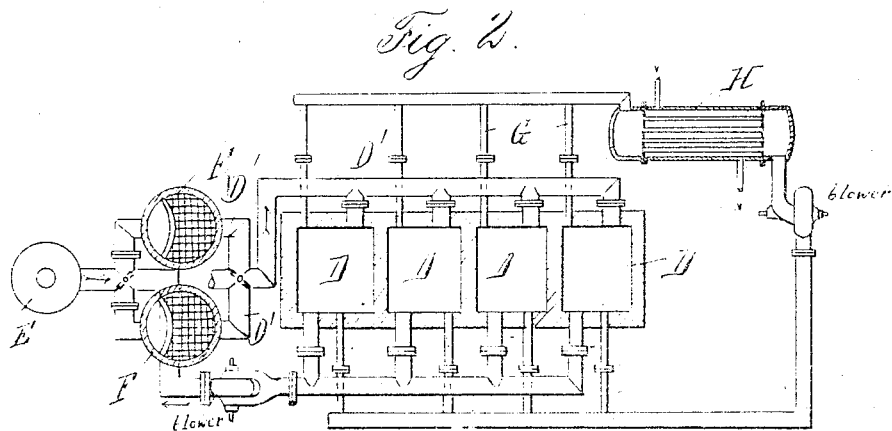
Figure 3:
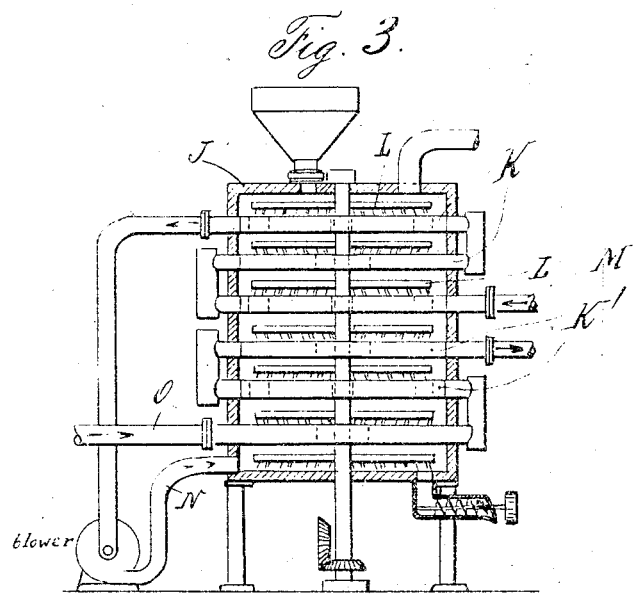

The accompanying drawing shows, in diagrammatic sections, three different forms of apparatus suitable for carrying out my improved process, Figures 1 and 3 being vertical sections, and Fig. 2 a horizontal section.

As an example of the procedures which may be adopted according to my invention, I will describe the following with reference to Fig. 1: The ore, after being crushed to a fineness of from ½ to 5 millimeters is fed at *a* into a revolving furnace A, which also receives a supply of reducing gases, such as producer-gas from a producer B, hydrogen, coke-oven gas, or blast-furnace gases, admitted, say through a pipe A'; at the lower end of the revolving furnace or drum. This drum and the material therein are heated either externally, or as shown by preheating the reducing gases on their way to said drum, for instance in iron superheater tubes A. The gases which have been used for the reduction may, after leaving the drum at *a'*, be used for heating the apparatus C in which the gas is preheated, as by diverting a portion of such waste gases to said apparatus through a branch pipe *a"*.

According to another species of my invention, the ore, with the addition of a medium soluble in water or in acids (lime or pitch being examples of such mediums) is pressed into bricks, sawdust being added in some cases for producing porosity and a partial reduction. These bricks are then stacked in a suitable furnace (see the chambers D in Fig. 2), say, a Mendheim furnace, and are heated to the proper reduction temperature by means of a reducing flame of a gas supplied through pipes D' from the producer E and one of the regenerators F. Subsequently, the material is cooled by a separate stream of reducing gases supplied through pipes G and cooled in cooler H.

In this case also I prefer to resort to indirect heating, by preheating the reducing gases in iron or brick apparatus or regenerators F of the type known as blast-heaters, the spent reducing gases being used as fuel or heating medium in such apparatus.

A third way of carrying out my improved process consists in delivering the ore to a furnace J, (see Fig. 3), similar to a puddling furnace, with superposed circular plate-like hearths K, K', furnaces of this type being used, for instance, as drying furnaces for the raw material in the manufacture of lignite briquets. In this furnace, the ore is moved or fed by means of rake arms L, so as to pass successively over the several hearths, from the top to the bottom of the furnace. The upper hearths K are heated to the reaction temperature in any suitable manner, for instance by means of fresh gas heated in a separate apparatus (not shown) and then passed through a pipe M and through the hollow upper hearths K to be admitted subsequently to the furnace at the bottom through a pipe N. Cooling water is circulated through the lower hearths K', by means of a pipe O for the purpose of quickly bringing the ore to a temperature below the one at which re-oxidation will take place in the presence of air.

The completion of the reduction is ascertained either by a lixiviation test made with a small quantity of treated ore, or simply by observing a characteristic darkening of the color of the ore. The reduction having been completed, the iron contained in the ore is removed either by washing the product with aqueous hydrochloric or sulfuric acid in wood or iron vats or in revolving drums leaded or lined, whereupon the ore is separated from the lye, say in settling tanks; or, the iron may be removed by means of hydrochloric acid gas in horizontal retorts provided with screw agitators and heated externally. It will be understood that the nature of the ore to be treated will determine the character of the apparatus to be employed.

I claim as my invention:

1. The herein described process for removing iron from iron-bearing tin ores, which consists in subjecting the ore to a reducing treatment at a temperature at which the tin will remain in a form insoluble in acids, while the iron contents will be reduced to a form readily soluble in acids, and then subjecting the resulting product to treatment with acid.

2. The herein described process for removing iron from ferruginous tin ores, which consists in subjecting the material, in a condition in which the tin is present as oxid, to a reducing treatment at a temperature at which the tin will remain in a form insoluble in acids, and then subjecting the resulting product to treatment with acid.

3. The herein described process for removing iron from ferruginous tin ores, which consists in subjecting the material, in a condition in which the tin is present in oxidized form, to a reducing treatment at a temperature not exceeding 500° centigrade, so as to leave the tin in a form in which it is insoluble in acids, while reducing the iron contents to a form readily soluble in acids, and then subjecting the resulting product to treatment with acid, so as to combine the iron contents with the acid while leaving the tin contents unaffected.

In testimony whereof, I have signed this specification in the presence of two subscribing witnesses.

GÜNZEL von RAUSCHENPLAT.

Witnesses:
  WOLDEMAR HAUPT,
  HENRY HASPER.